United States Patent
Fukuman et al.

(10) Patent No.: US 10,436,899 B2
(45) Date of Patent: Oct. 8, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 28 days.

(21) Appl. No.: 14/880,526

(22) Filed: Oct. 12, 2015

(65) Prior Publication Data
US 2016/0116585 A1 Apr. 28, 2016

(30) Foreign Application Priority Data
Oct. 22, 2014 (JP) ................................ 2014-215093

(51) Int. Cl.
*G01S 15/93* (2006.01)
*G01S 7/527* (2006.01)
(Continued)

(52) U.S. Cl.
CPC .......... *G01S 15/931* (2013.01); *G01S 7/527* (2013.01); *G01S 15/878* (2013.01); *G01S 15/46* (2013.01); *G01S 2015/938* (2013.01)

(58) Field of Classification Search
CPC .......... G01S 15/96; G01S 15/93; G01S 15/46
See application file for complete search history.

(56) References Cited

U.S. PATENT DOCUMENTS 3,418,625 A 12/1968 Nigel
5,122,990 A 6/1992 Deines
(Continued)

FOREIGN PATENT DOCUMENTS

CN 103605125 2/2014
JP S63127179 5/1988
(Continued)

OTHER PUBLICATIONS

Chinese document, "The Basic Characteristics of a Multiple Echo", in 8 pages.
(Continued)

*Primary Examiner* — Hovhannes Baghdasaryan
(74) *Attorney, Agent, or Firm* — Knobbe, Martens, Olson & Bear, LLP (57) ABSTRACT

An object detection apparatus includes a first acquisition unit that acquires, as a first direct wave group, reflected versions of first probing waves transmitted from and received at a first position, and acquires, as a first indirect wave group reflected versions of the first probing waves received at a second position, a second acquisition unit that acquires, as a second indirect wave group, reflected versions of second probing waves transmitted from the second position and received at the first position, and acquires, as a second direct wave group, reflected versions of the second probing wave received at the second position, and a determination unit that determines whether the object is a real object or a ghost in accordance with the receptions times of the first and second direct wave groups and the first and second indirect wave groups.

2 Claims, 5 Drawing Sheets (51) Int. Cl.
*G01S 15/87* (2006.01)
*G01S 15/46* (2006.01)

(56) References Cited

U.S. PATENT DOCUMENTS

| | | | |
|---|---|---|---|
| 5,315,562 | A | 5/1994 | Bradley |
| 5,689,250 | A | 11/1997 | Kremser |
| 5,761,155 | A | 6/1998 | Eccardt et al. |
| 5,923,282 | A | 7/1999 | Honma et al. |
| 5,940,011 | A | 8/1999 | Agravante et al. |
| 6,289,282 | B1 * | 9/2001 | Hassler ............. B60Q 9/006 342/455 |
| 6,434,486 | B1 | 8/2002 | Studt |
| 6,898,528 | B2 | 5/2005 | Zorka |
| 7,068,155 | B2 | 6/2006 | Kade |
| 7,202,776 | B2 | 4/2007 | Breed |
| 7,873,181 | B1 | 1/2011 | Maluf |
| 8,108,147 | B1 | 1/2012 | Blackburn |
| 8,452,506 | B2 | 5/2013 | Groult |
| 8,605,947 | B2 | 12/2013 | Zhang et al. |
| 8,989,944 | B1 | 3/2015 | Agarwal et al. |
| 9,221,396 | B1 | 12/2015 | Zhu et al. |
| 9,507,023 | B2 | 11/2016 | Nakano |
| 9,541,644 | B2 | 1/2017 | Hoenes et al. |
| 2002/0047780 | A1 | 4/2002 | Nishimoto |
| 2003/0195704 | A1 | 10/2003 | Sekiguchi |
| 2004/0238249 | A1 | 12/2004 | Kim |
| 2005/0046606 | A1 | 3/2005 | Yoneda |
| 2005/0195071 | A1 | 9/2005 | Ewerhart et al. |
| 2006/0013069 | A1 | 1/2006 | Wilson |
| 2006/0031015 | A1 | 2/2006 | Paradie |
| 2006/0085177 | A1 | 4/2006 | Toyama et al. |
| 2006/0119473 | A1 | 6/2006 | Gunderson et al. |
| 2007/0176822 | A1 | 8/2007 | Shirakawa |
| 2008/0068146 | A1 | 3/2008 | Cauldwell |
| 2008/0204208 | A1 | 8/2008 | Kawamata et al. |
| 2009/0299662 | A1 | 12/2009 | Fehrenbach |
| 2010/0214872 | A1 | 8/2010 | Schmid et al. |
| 2011/0044507 | A1 | 2/2011 | Strauss et al. |
| 2011/0133917 | A1 | 6/2011 | Zeng |
| 2011/0241857 | A1 | 10/2011 | Brandenburger et al. |
| 2012/0307594 | A1 | 12/2012 | Enoue et al. |
| 2014/0340993 | A1 | 11/2014 | Honda |
| 2015/0097704 | A1 | 4/2015 | Kwon |
| 2015/0310281 | A1 | 10/2015 | Zhu et al. |
| 2016/0253575 | A1 | 9/2016 | Kakegawa et al. |
| 2017/0261602 | A1 | 9/2017 | Olshansky et al. |

FOREIGN PATENT DOCUMENTS

| | | |
|---|---|---|
| JP | H06-138225 | 5/1994 |
| JP | H06-150195 | 5/1994 |
| JP | 2005-070943 | 3/2005 |
| JP | 2008-039497 | 2/2008 |
| JP | 2008-122137 | 5/2008 |
| JP | 2013-124982 | 6/2013 |
| JP | 2014-089077 A | 5/2014 |
| JP | 2014-093039 | 5/2014 |
| JP | 2015-004562 A | 1/2015 |
| KR | 2013-0119674 | 11/2013 |
| WO | WO 2005/091015 | 9/2005 |

OTHER PUBLICATIONS

"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.

Installation and Operation of Ship Navigation System, Beijing Institute of Technology Press, dated Aug. 2014 in 8 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.
United States Patent and Trademark Office, Office Action, U.S. Appl. No. 14/887,623, dated Aug. 30, 2017 in 21 pages.
United States Patent and Trademark Office, Final Office Action, U.S. Appl. No. 14/887,623, dated May 7, 2018 in 38 pages.
United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/918,920, dated Feb. 23, 2017 in 13 pages.
United States Patent and Trademark Office, Office Action, U.S. Appl. No. 14/918,920, dated Dec. 15, 2017 in 13 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
United States Patent and Trademark Office, Office Action, U.S. Appl. No. 14/887,625, dated May 10, 2018 in 26 pages.
United States Patent and Trademark Office, Notice of Allowance, U.S. Appl. No. 14/918,920, dated Apr. 11, 2018 in 7 pages.
United States Patent and Trademark Office, Final Office Action, U.S. Appl. No. 14/918,319, dated Jul. 19, 2018 in 12 pages.
Tian Fenxia, "Pipeline Obstacle Detecting and Locating Based on Ultrasonic Waves", Southwest Jiaotong Postraduate Dissertation, Jun. 2013, TP391, p. 30.
U.S. Appl. No. 14/887,623, filed Oct. 20, 2015, Fukuman et al.
U.S. Appl. No. 14/887,625, filed Oct. 20, 2015, Fukuman et al.
U.S. Appl. No. 14/918,319, filed Oct. 20, 2015, Fukuman et al.
U.S. Appl. No. 14/918,330, filed Oct. 20, 2015, Fukuman et al.
U.S. Appl. No. 14/918,373, filed Oct. 20, 2015, Fukuman et al.
U.S. Appl. No. 14/918,920, filed Oct. 21, 2015, Fukuman et al.
U.S. Appl. No. 14/919,498, filed Oct. 21, 2015, Fukuman et al.
U.S. Appl. No. 14/919,562, filed Oct. 21, 2015, Fukuman et al.
Notice of Allowance and Fee(s) Due, U.S. Appl. No. 14/919,562, dated Aug. 1, 2018, in 11 pages.
Notice of Allowance and Fee(s) Due, U.S. Appl. No. 14/918,920, dated Jun. 11, 2018, in 11 pages.
Notice of Allowance and Fee(s) Due, U.S. Appl. No. 14/887,623, dated Sep. 4, 2018, in 28 pages.
Corrected Notice of Allowance and Fee(s) Due, U.S. Appl. No. 14/887,623, dated Sep. 11, 2018, in 5 pages.
Notice of Allowance and Fee(s) Due, U.S. Appl. No. 14/887,625, dated Sep. 10, 2018, in 14 pages.
Office Action, U.S. Appl. No. 14/918,330, dated Sep. 11, 2018, in 14 pages.
Office Action of U.S. Appl. No. 14/918,319 dated Nov. 26, 2018.
Notice of Allowance of U.S. Appl. No. 14/918,373 dated Oct. 18, 2018.
Notice of Allowance of U.S. Appl. No. 14/918,920 dated Oct. 18, 2018.
Final Office Action for U.S. Appl. No. 14/918,330, dated Feb. 12, 2019.
Notice of Allowance and Fee(s) Due, U.S. Appl. No. 14/919,562, dated Dec. 26, 2018, in 9 pages.

* cited by examiner

OBJECT DETECTION APPARATUS

This application claims priority to Japanese Patent Application No. 2014-215093 filed on Oct. 22, 2014, the entire contents of which are hereby incorporated by reference.

BACKGROUND OF THE INVENTION

1. Field of the Invention

The present invention relates to an object detection apparatus.

2. Description of Related Art

It is known to equip a vehicle with distance sensors such as ultrasonic sensors to detect an object present in the vicinity of the vehicle, such as a preceding vehicle, a pedestrian, or an obstacle to enable performing various control operations such as starting of a brake apparatus, or notification to a vehicle driver in accordance with results of the object detection for the purpose of increasing running safety of the vehicle.

When an object is present outside a vehicle width area of the vehicle, the risk of a collision between the vehicle and the object is small. However, if only the distance between the vehicle and the object is measured without detecting the position of the object in the vehicle width direction perpendicular to the running direction of the vehicle, it may be determined that there is a risk of a collision with the object and the vehicle driver is informed to that effect, although the object is present outside the vehicle width area.

Japanese Patent Application Laid-open No. 2014-89077 describes an object detection apparatus for detecting a position in the vehicle width direction of an object which is ahead of a vehicle on which the object detection apparatus is mounted. This object detection apparatus includes two distance sensors mounted on a vehicle, and calculates the position of an object in the vehicle width direction using a triangulation method. This object detection apparatus determines that there is a risk of a collision with the object when the calculated position is within a vehicle width area of the vehicle, and determines that there is no risk of collision with the object when the calculated position is outside the vehicle width area. This object detection apparatus is capable of preventing a brake apparatus from being operated when there is no object within the vehicle width area.

However, the object detection apparatus described in the above patent document has the following problem. This object detection apparatus can detect only one object per one object-detection cycle. More specifically, when a plurality of objects are present ahead of the vehicle, the object detection apparatus detects only one of the objects which is the closest to the vehicle, but cannot detect the other objects. Accordingly, in a situation where the closest object is outside the vehicle width area, but another object which is more distant from the vehicle than the closest object is exists within the vehicle width area, there is a concern that the brake apparatus does not operate although there is a risk of a collision.

SUMMARY

An exemplary embodiment provides an object detection apparatus for detecting at least one object present in a vicinity thereof by transmitting first probing waves from a first position and subsequently transmitting second probing waves from a second position different from the first position, a detection area of the first probing waves and a detection area of the second probing waves being partially overlapped with each other, and by receiving reflected versions of the first and second probing waves as detection data of the object, including:

a first acquisition unit that acquires, as a first direct wave group including first direct waves, the reflected versions of the first probing waves received as the first direct waves at the first position, and acquires, as a first indirect wave group including first indirect waves, the reflected versions of the first probing waves received as the first indirect waves at the second position;

a second acquisition unit that acquires, as a second indirect wave group including second indirect waves, the reflected versions of the second probing waves received as the second indirect waves at the first position, and acquires, as a second direct wave group including second direct waves, the reflected versions of the second probing waves received as the second direct waves at the second position;

a first calculation unit that calculates a position of the object in accordance with combinations each including one of the first direct waves and one of the first indirect waves;

a second calculation unit that calculates the position of the object in accordance with combinations each including one of the second direct waves and one of the second indirect weaves; and a determination unit that determines whether the object is a ghost or not depending on whether the position of the object has been calculated by both the first and second calculation units or has been calculated by only one of the first and second calculation units; wherein the determination unit determines that the object whose position is calculated by the first calculation unit is a real object if a difference of a distance to the object detected based on reception times of the first direct waves and a distance to the object detected based on reception times of the first indirect waves is larger than a predetermined threshold, and determines that the object whose position is calculated by the second calculation unit is a real object if a difference of a distance to the object detected based on reception times of the second direct waves and a distance to the object detected based on reception times of the second indirect waves is larger than a predetermined threshold.

According to the exemplary embodiment, there is provided an object detection apparatus capable of correctly detecting a plurality of objects present in the vicinity of the object detection apparatus.

Other advantages and features of the invention will become apparent from the following description including the drawings and claims.

PREFERRED EMBODIMENTS OF THE INVENTION

Figure 1:
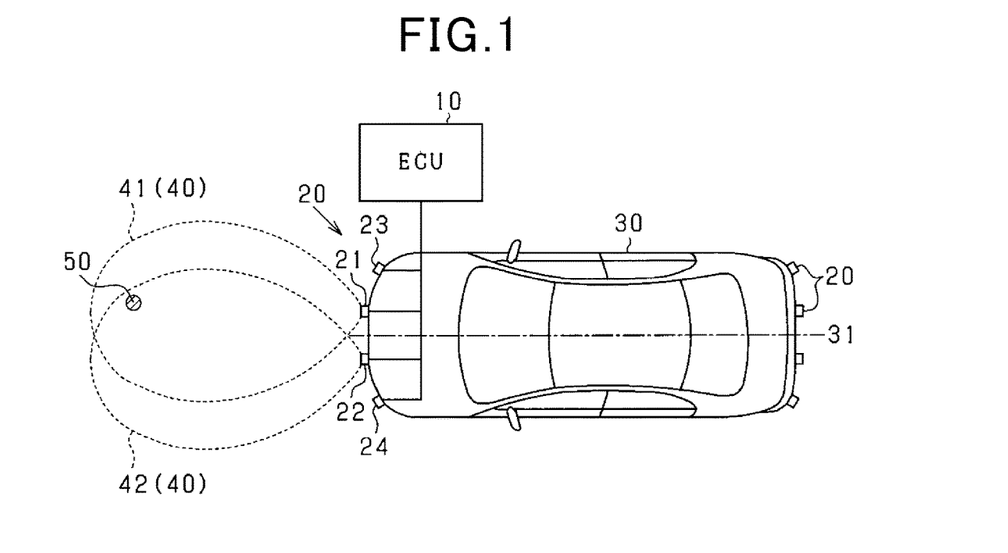
FIG. 1 is a diagram schematically showing the structure of an object detection apparatus according to an embodiment of the invention.

FIG. 1 is a diagram schematically showing the structure of an object detection apparatus according to an embodiment of the invention.

In FIG. 1, the reference numeral 20 denotes a distance sensor (an ultrasonic sensor in this embodiment). The distance sensor 20 has a function of transmitting ultrasonic waves of 20 kHz to 200 kHz as probing waves, and a function of receiving the probing waves reflected from an object as returning waves. In this embodiment, four distance sensors (collectively designated by the reference numeral 20) are mounted to a front part (the front bumper, for example) of a vehicle 30 such that they are arranged with a distance in the vehicle width direction perpendicular to the running direction of the vehicle 30. More specifically, the distance sensors 20 includes first and second sensors 21 and 22 disposed near the center line of the vehicle 30 symmetrically with respect to the center line 31 of the vehicle 30, and third and fourth sensors 23 and 24 disposed at the left and right corners of the vehicle 30, respectively. Although not explained here, the distance sensors 20 are mounted also to a rear part (the rear bumper, for example) of the vehicle 30 in a similar way as those mounted to the front part of the vehicle 30.

Each of the distance sensors 20 is assigned to an object detection area (collectively designated by the reference numeral 40) in which it can receive the returning waves (or direct waves) of the probing waves which it transmits. The distance sensors 20 are mounted such that two object detection areas 40 of each adjacent two of the distance sensors 20 partially overlap with each other. In FIG. 1, only the object detection areas 41 and 42 are shown, however, actually, the object detection area 40 is set for each of the third and fourth sensors 23 and 24. An amplitude threshold is set for each distance sensor 20. When the distance sensor 20 has received the returning waves having an amplitude larger than this threshold, the distance sensor 20 sends detection data including the time at which the returning waves were received to an ECU 10 as an object detection apparatus.

The ECU 10, which is a microcomputer-based unit including a CPU and memory devices, determines presence or absence of an object 50 in the vicinity of the vehicle 30 based on the detection data sent from the distance sensors 20. The ECU 10 commands each distance sensor 20 to transmit the probing waves every transmission cycle with a predetermined time interval (several hundred milliseconds, for example) by sending a control signal to each distance sensor 20.

When the ECU 10 determines that the object 50 is present in the vicinity of the vehicle 30, the ECU 10 performs steering control or braking control as collision preventing control, or informs the vehicle driver of the vehicle 30 by a warning sound.

The ECU 10 calculates the position of the object 50 relative to the vehicle 30 using a triangulation method based on the detection data received from the distance sensors 20. The triangulation method is such that the coordinates of a measurement point is calculated based on the distance between known two points and distances to the known two points. The ECU 10 calculates the position (coordinates) of the object 50 based on the distance of the two adjacent distance sensors 20 whose detection areas 40 partially overlap with each other, and the distances between the object 50 and theses distance sensors 20.

An example of the method of calculating the position of the object 50 is explained in more detail with reference to FIG. 2. In this example, the first sensor 21 is used as a direct detection sensor which transmits probing waves 25 and receives returning waves of the probing waves 25 as direct waves 26 at a first position, and the second sensor 22 is used as an indirect wave detection sensor which receives the returning waves of the probing waves 25 transmitted from the first sensor 21 as indirect waves 27 at a second position.

The ECU 10 calculates, as an estimated position of the object 50, an x-coordinate and a y-coordinate of the position of the object 50 in an coordinate system whose X-axis passes through the first and second sensors 21 and 22, and whose Y-axis passes through the middle point between the first and second sensors 21 and 22 and is perpendicular to the X-axis. The ECU 10 causes the first sensor 21 to transmit the probing waves 25. When a reflected version of the probing waves 25 are received as the direct waves 26 by the first sensor 21, the ECU 10 calculates the distance between the first sensor 21 and the object 50 in accordance with the direct waves 26. Further, when the reflected version of the probing waves 25 is received as the indirect waves 27 by the second sensor 22, the ECU 10 calculates the distance between the second sensor 22 and the object 50 in accordance with the indirect waves 27.

The distance d between the first sensor 21 and the origin point O of the coordinate system, or the intersection point of the X-axis and the Y-axis, which is the same as the distance between the second sensor 22 and the origin point O, is stored beforehand in the ECU 10. Also, the ECU 10 calculates, as a first time period t1, the time at which the direct waves 26 were received by the first sensor 21 minus the time at which the probing waves 25 were transmitted by the first sensor 21, and calculates, as a second time period t2, the time at which the indirect waves 27 were received by the second sensor 22 minus the time at which the probing waves 25 were transmitted by the first sensor 21. The product of the first time period t1 and the speed of the sound is equal to twice the distance between the first sensor 21 and the object 50, and the product of the second time period t2 and the speed of the sound is equal to the sum of the distance between the first sensor 21 and the object 560 and the distance between the second sensor 22 and the object 50. The ECU 10 calculates the coordinates (x, y) of the object 50 by performing the triangulation method using the distance 2$d$ between the first and second sensors 21 and 22, the first time period t1, and the second time period t2.

Figure 2:
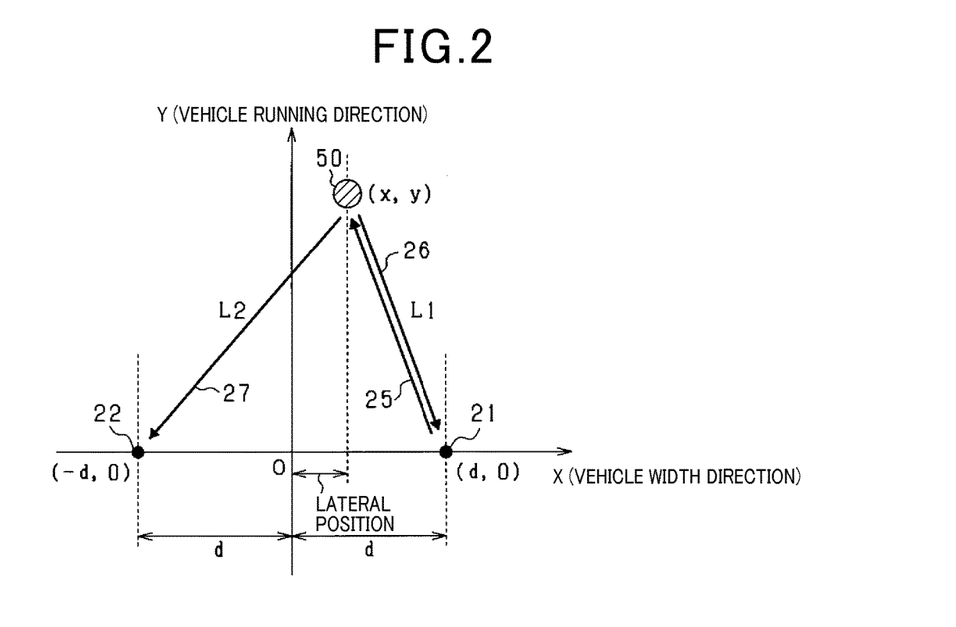
FIG. 2 is a diagram for explaining a method of calculating the position of an object.

In the example of FIG. 2, the first sensor 21 is used as a direct detection sensor and the second sensor 22 is used as an indirect detection sensor. However, it is possible to calculate the position of the object 50 in a similar manner also when the first sensor 21 is used as an indirect detection sensor and the second sensor 22 is used as a direct detection sensor. In this embodiment, the position of the object 50 is calculated for each combination of adjacent two of the distance sensors 21 to 24 mounted to the front part of the vehicle 30. Likewise, the position of the object 50 is calculated for each combination of adjacent two distance sensors 20 mounted to the rear part of the vehicle 30.

Figure 3:
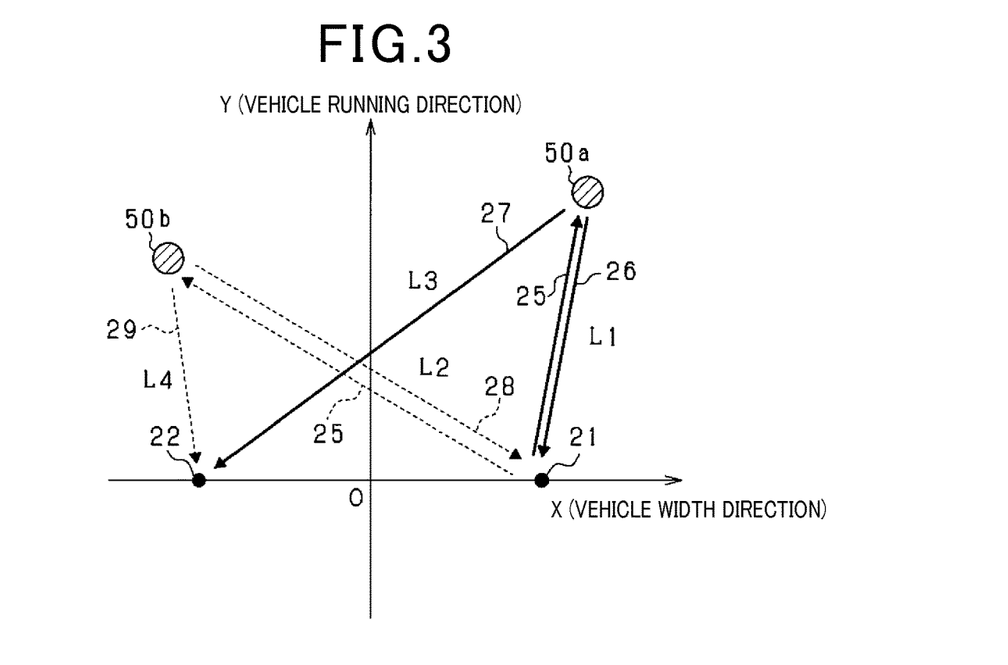
FIG. 3 is a diagram for explaining a method of calculating the positions of two objects.

Incidentally, there are cases where two objects are present within the object detection area 40. FIG. 3 shows an example of such cases, in which a first object 50a and a second object 50b are present within the object detection area. Here, it is assumed that the distance between the first sensor 21 and the first object 50a is equal to a first distance L1, the distance between the first sensor 21 and the second object 50b is equal to a second distance L2, the distance between the second sensor 22 and the first object 50a is equal to a third distance L3, and the distance between the second sensor 22 and the second object 50b is equal to a fourth distance L4. Also, it is assumed that the second distance L2 is larger than the first distance L1.

The probing waves 25 transmitted from the first sensor 21 are reflected by the first object 50a and the second object 50b, and enter the first sensor 21 as first direct waves 26 and second direct waves 28, respectively. Also, the probing waves 25 are reflected by the first object 50a and the second object 50b, and enter the second sensor 22 as first indirect waves 27 and second indirect waves 29, respectively.

At this time, the propagation time of the first direct waves 26 depends on the first distance L1, and the propagation time of the second direct waves 28 depends on the second distance L2. Accordingly, there is a time difference between the incident time of the first direct waves 26 (the time at which the first direct waves 26 enter the first sensor 21) and the incident time of the second direct waves 28 (the time at which the second direct waves 28 enter the first sensor 21), the time difference depending on the difference between the first distance L1 and the second distance L2. Likewise, the propagation time of the first indirect waves 27 depends on the third distance L3, and the propagation time of the second indirect waves 29 depends on the fourth distance L4. Accordingly, there is a time difference also between the incident time of the first indirect waves 27 and the incident time of the second indirect waves 29 depending on the difference between the sum of the first distance L1 and the third distance L3 and the sum of the second distance L2 and the fourth distance L4.

To calculate the positions of the objects 50a and 50b by the triangulation method, one of the first direct waves 26 and the second direct waves 28 and one of the first indirect waves 27 and the second indirect waves 29 are used.

The positions of the objects 50a and 50b can be correctly calculated by performing the triangulation method using the combination of the first direct waves 26 and the first indirect waves 27 and the combination of the second direct waves 28 and the second indirect waves 29. However, although there is a difference between the incident time of the first indirect waves 27 reflected from the first object 50a and the incident time of the second indirect waves 29 reflected from the second object 50b, it is not possible to determine from which of the objects 50a and 50b they are reflected based on only these incident times.

Accordingly, it is necessary to decide whether the triangulation method should be performed based on the combination of the first direct waves 26 and the first indirect waves 27 and the combination of the second direct waves 28 and the second indirect waves 29, or based on the combination of the first direct waves 26 and the second indirect waves 29 and the combination of the second direct waves 28 and the first indirect waves 27.

This is because if the triangulation method is performed based on the combination of the first direct waves 26 and the second indirect waves 29 and the combination of the second direct waves 28 and the first indirect waves 27, a position of a ghost is calculated.

Figure 4:
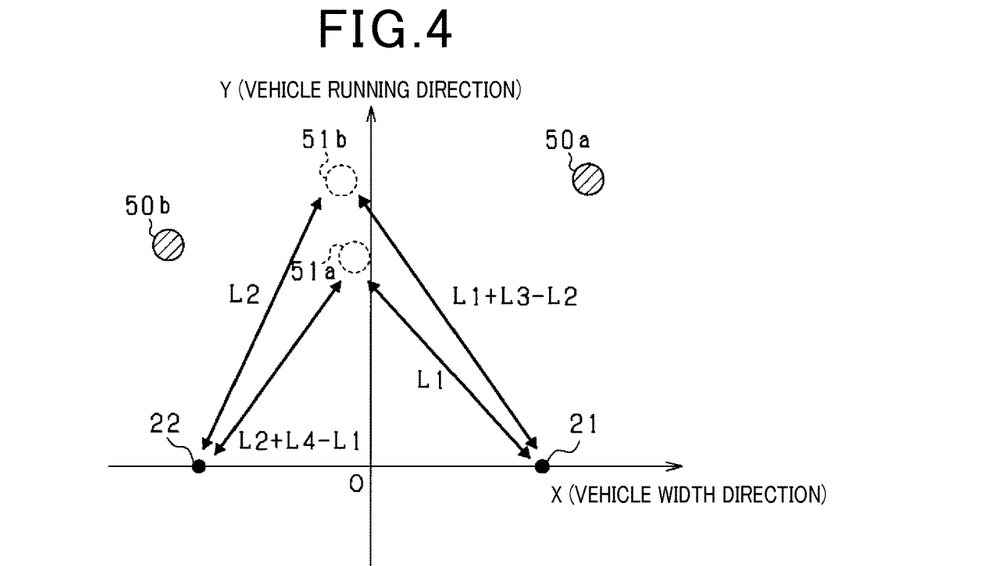
FIG. 4 is a diagram showing an example in which the position of a ghost is calculated.

FIG. 4 shows an example in which the position of a first ghost 51a is calculated using the first direct waves 26 and the second indirect waves 29, and the position of a second ghost 51b is calculated using the second direct waves 58 and the first indirect waves 27. The position of the first ghost 51a is calculated as a position distant from the first sensor 21 by the first distance L1, and distant from the second sensor 22 by the sum of the second distance L2 and the fourth distance L4 minus the first distance L1. The position of the second ghost 51b is calculated as a position distant from the second sensor 22 by the second distance L2, and distant from the first sensor 21 by the sum of the first distance L1 and the third distance L3 minus the second distance L2.

Figure 5:
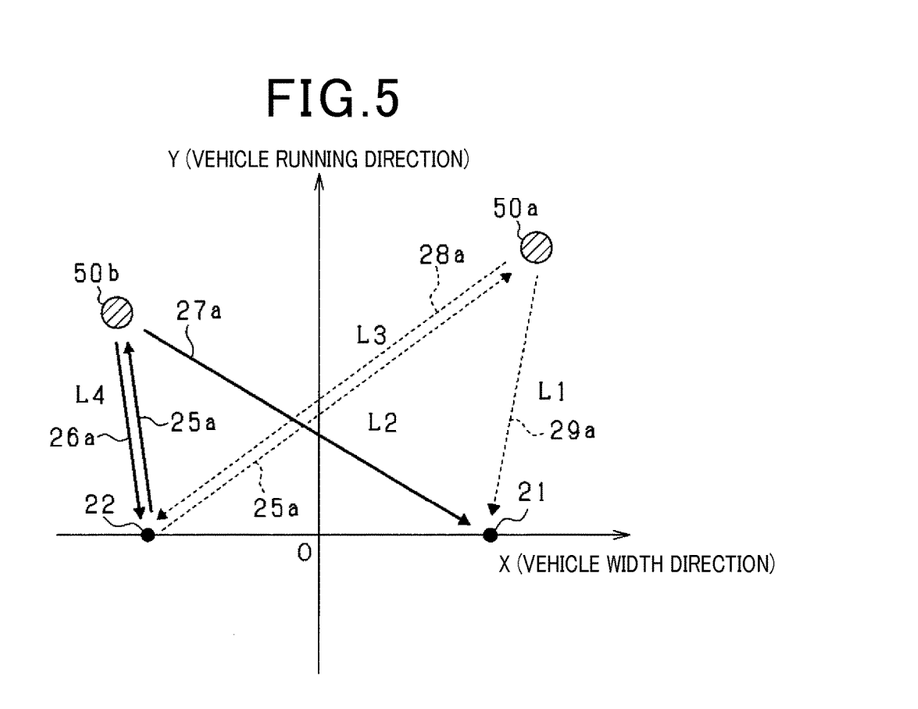
FIG. 5 is a diagram showing a situation in which direct waves and indirect waves are received by a direct wave detection sensor and an indirect wave detection sensor which have been switched with each other.

To determine whether the calculated position is the position of a real object or the position of a ghost, the direct detection sensor and the indirect detection sensor are switched with each other. Specifically, as shown in FIG. 5, the second sensor 22 is used as a direct detection sensor, and the first sensor 21 is used as an indirect detection sensor.

Probing waves 25a transmitted from the second sensor 22 are reflected by the second object 50b and the first object 50a, and enter the second sensor 22 respectively as first direct waves 26a and second direct waves 28a. Also, the probing waves 25a are reflected by the first object 50a and the second object 50b, and enter the first sensor 21 respectively as first indirect waves 27a and second indirect waves 29a.

The positions of the second object 50b and the first object 50a can be calculated when the triangulation method is performed using the combination of the first direct waves 26a and the first indirect waves 27a and the combination of the second direct waves 28a and the second indirect waves 29a, respectively. On the other hand, when the triangulation method is performed using the combination of the first direct waves 26a and the second indirect waves 29a and the combination of the second direct waves 28a and the first indirect waves 27a, respectively, positions different from the positions of the first and second ghosts 51a and 51b are calculated.

Accordingly, if the position calculated in the case where the first sensor 21 is used as a direct detection sensor and the second sensor 22 is used as an indirect sensor is the same as the position calculated in the case where the second sensor 22 is used as a direct detection sensor and the first sensor 21 is used as an indirect sensor, it can be determined that a true object is present at the calculated position.

Figure 6:
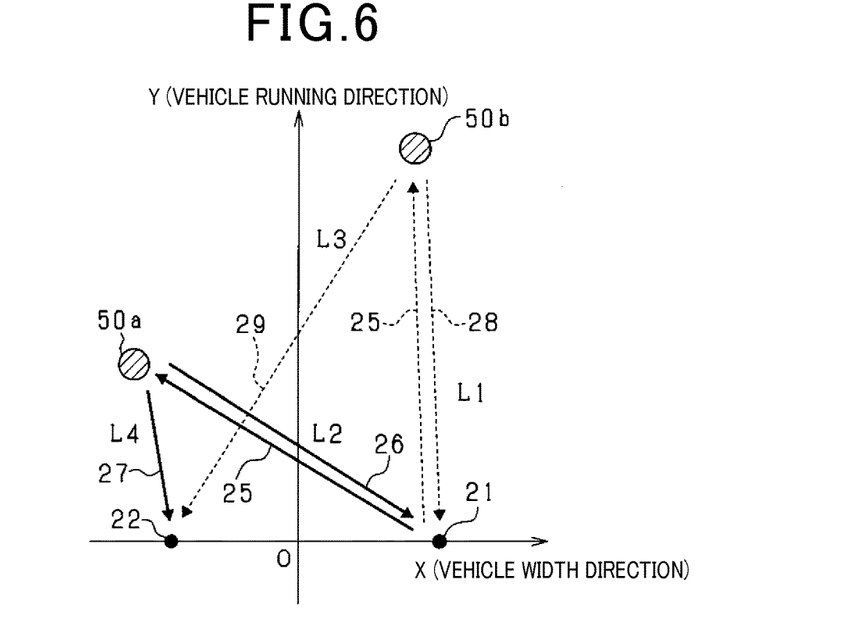
FIG. 6 is a diagram showing a situation in which direct waves and indirect waves are received by the direct wave detection sensor and the indirect wave detection sensor when a second object is present in the distance.
Figure 7:
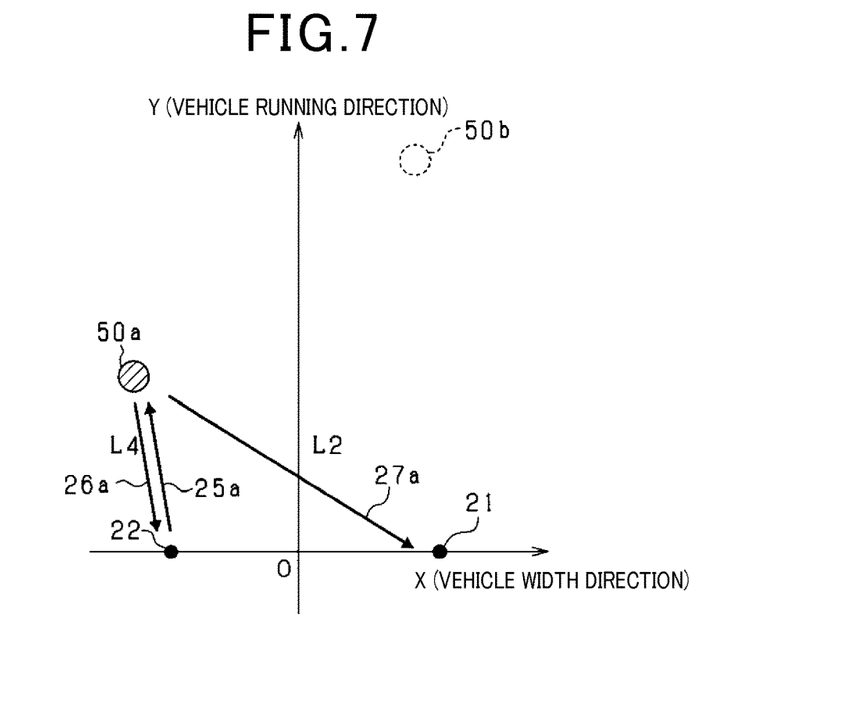
FIG. 7 is a diagram showing a situation in which the direct waves and the indirect waves are received by the direct wave detection sensor and the indirect wave detection sensor which have been switched with each other contrary to the situation shown in FIG. 6.

Incidentally, in a case where the first sensor 21 is used as a direct detection sensor and the second sensor 22 is used as an indirect detection sensor when only the second object 50b is at a position quite distant from the second sensor 22 as shown in FIG. 6, the probing waves 25 transmitted from the first sensor 21 are reflected by the second object 50b, the first sensor 21 receives the second direct waves 28, and the second sensor 22 receives the second indirect waves 29. In this case, it may occur that the probing waves 25a transmitted from the second sensor 22 are reflected by a not shown object present at a position closer to the second sensor 22 than the second object 50b is, and resultant direct and indirect waves are received. In this case, as shown in FIG. 7, since the second object 50b is detected only when the first sensor 21 is used as a direct detection sensor, it is erroneously determined that the second object 50b is a ghost as a result of switching the first and second sensors with each other. If the collision prevention control is performed based on this erroneous determination, there is a possibility of a collision between vehicle 30 and the second object 50b.

Meanwhile, there is a case where the triangulation method using a direct detection sensor and an indirect detection sensor does not hold for the position calculation as described below. The position of the second object 50b is calculated as the coordinates of the intersection point between the circle centered at the first sensor 21 and having a radius equal to the first distance L1 and the circle centered at the second sensor 22 and having a radius equal to the third distance L3. Likewise, the position of the first object 50b is calculated as the coordinates of the intersection point between the circle centered at the first sensor 21 and having a radius equal to the second distance L2 and the circle centered at the second sensor 22 and having a radius equal to the fourth distance L4. On the other hand, if the distance between the first object 50a and the second object 50 is sufficiently large, no intersection point is formed between the circle centered at the first sensor 21 and having a radius equal to the first distance L1 and the circle centered at the second sensor 22 and having a radius equal to the sum of the second distance L2 and the fourth distance L4 minus the first distance L1. That is, the triangulation method using the first direct waves 26 and the second indirect waves 29 does not hold for the position calculation. For the same reason, the triangulation method using the second direct waves 28 and the first indirect waves 27 does not hold for the position calculation.

Therefore, this embodiment utilizes the fact that no ghost is detected if a difference between a detected distance based on the first indirect waves 27 reflected from the first object 50a and a detected distance based on the second indirect waves 29 reflected from the second object 50b is sufficiently large. Specifically, an object whose detected distance is larger than a predetermined threshold is excluded from being a subject of a later-explained ghost determination operation. For example, as shown in FIG. 6, when the second object 50b is quite distant from the second sensor 22, since the triangulation method does not hold for the position calculation in most cases, the second object 50b can be excluded from being a subject of the ghost determination operation.

Figure 8:
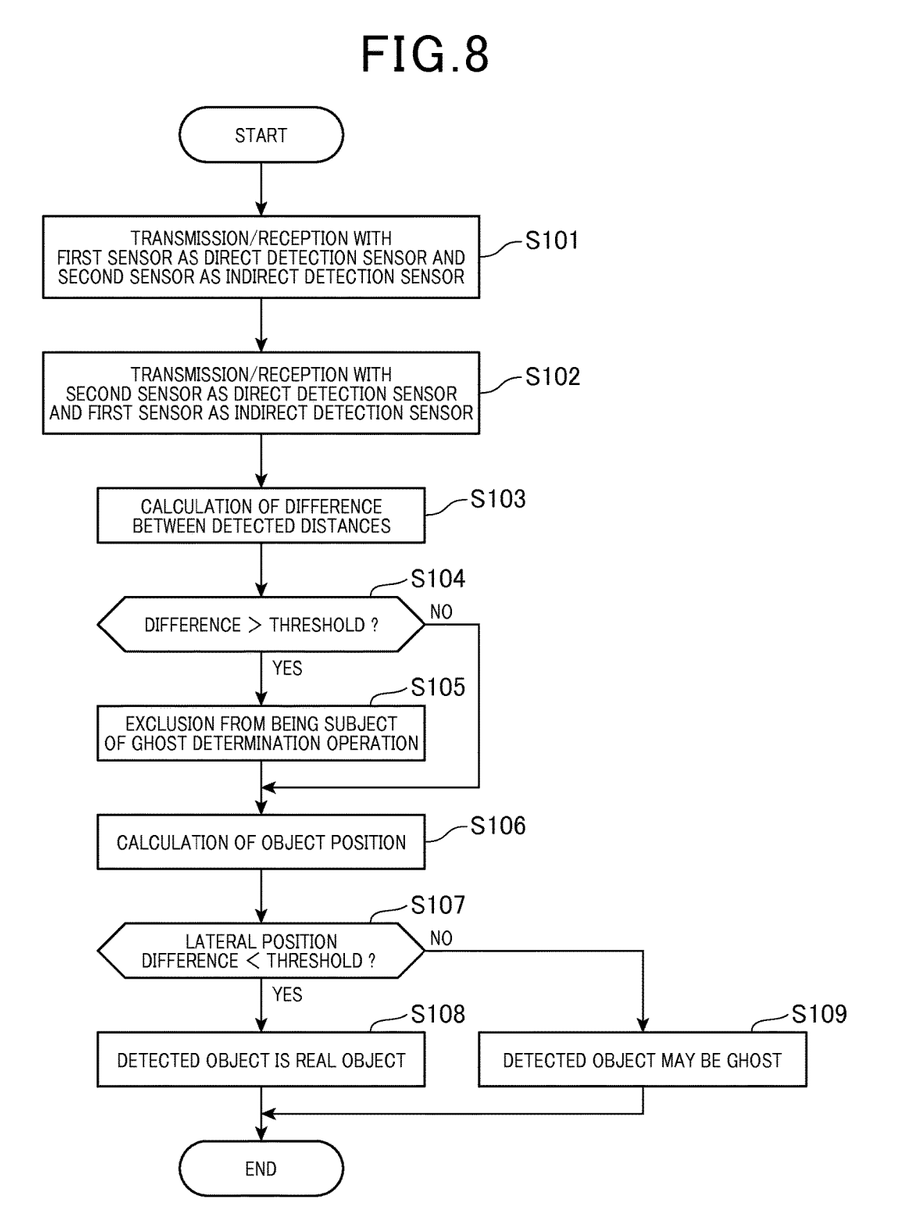
FIG. 8 is a flowchart showing steps of an object detection process performed by the object detection apparatus according to the embodiment of the invention.

FIG. 8 is a flowchart showing steps of the object detection process performed by the object detection apparatus according to the above described embodiment.

This process begins in step S101 where first probing waves are transmitted and returning waves are received in the setting where the first sensor 21 is used as a direct detection sensor and the second sensor 22 is used as an indirect detection sensor. At this time, the ECU 10 serves as a first acquisition unit that acquires, as a first direct wave group, the first direct waves 26 and the second direct waves 28 received by the first sensor 21, and acquires, as a first indirect wave group, the first indirect waves 27 and the second indirect waves 29 received by the second sensor 22.

After an elapse of a predetermined time, second probing waves are transmitted and returning waves are received in the setting where the second sensor 22 is used as a direct detection sensor and the first sensor 21 is used as an indirect sensor in step S102. At this time, the ECU 10 serves as a second acquisition unit that acquires, as a second indirect wave group, the first indirect waves 27a and the second indirect waves 29a received by the first sensor 21, and acquires, as a second direct wave group, the first direct waves 26a and the second direct waves 28a received by the second sensor 22.

In subsequent step S103, the difference between the detected distance based on the first indirect waves and the detected distance based on the second indirect waves is calculated for each of the case where the first sensor 21 is used as a direct detection sensor and the second sensor 22 is used as an indirect detection sensor for transmitting the first probing waves, and the case where the second sensor 22 is used as a direct detection sensor and the first sensor 21 is used as an indirect sensor for transmitting the second probing waves. Step S103 is omitted if the second direct waves and the second indirect waves are not received for each of these cases.

Specifically, the difference between the detected distances which are detected based on the reception times of the first and second indirect waves 27 and 29 of the first indirect wave group, respectively, is calculated. Further, the difference between the detected distances which are detected based on the reception times of the first and second indirect waves 27a and 29a of the second indirect wave group, respectively, is calculated. Step S103 may be modified to calculate the difference between the detected distances based on the first and second direct waves, instead of the detected distances based on the first and second indirect waves.

In subsequent step S104, it is determine whether or not the calculated difference between the detected distances is larger than a threshold. This threshold is set in accordance with the distance between the first sensor 21 and the second sensor 22. When the difference between the detected distances is larger than the threshold, since the triangulation method does not hold except the correct combination of the direct waves and the indirect waves, no ghost's position is calculated. If the determination result in step S104 is affirmative, that is, if the difference between the detected distances is larger than the threshold, the process proceeds to step S105, where the combination of one of the first and second direct waves and one of the first and second indirect waves is excluded from being a subject of the ghost determination operation. At this time, the ECU 10 serves as a first exclusion unit and a second exclusion unit.

On the other hand, if the determination result in step S104 is negative, that is, if the difference between the detected distances is smaller than or equal to the threshold, the process proceeds to step S106 to perform the ghost determination operation.

In step S106, the position of the detected object is calculated by performing the triangulation method for each of the combinations of one of the first and second direct waves and one of the first and second indirect waves, for the case where the first sensor 21 is used as a direct detection sensor and the second sensor 22 is used as an indirect detection sensor. At this time the ECU 10 serves as a first calculation unit. Likewise, the position of the detected object is calculated for the case where the first sensor 21 is used as an indirect detection sensor and the second sensor 22 is used as a direct detection sensor. At this time the ECU serves as a second calculation unit.

Incidentally, if there is left only one combination as a subject of the ghost determination operation after performing step S105, only the position based on this one combination is calculated in step S106.

In subsequent step S107, it is determined whether or not the difference between the detected lateral positions (the difference of the components in the vehicle width direction or Y-direction of the calculated positions) is smaller than a predetermined threshold for each of the combinations. At this time, the ECU 10 serves as a determination unit. It is determined that the detected object is a real object and not a ghost in step 108 if the determination result in step S107 is affirmative for at least one of the combinations. On the other hand, it is determined that the detected object is a ghost in step S109 if the determination result in step S107 is negative for all of the combinations. After completion of step S108 or S109, this object detection process is terminated.

In the above described embodiment, the object detection process is performed using the adjacent pair of the first sensor 21 and the second sensor 22. However, the object detection process may be performed using other adjacent pairs of the sensors.

In the above described embodiment, the difference between the calculated positions in the vehicle width direction is compared with a threshold in step S107. However, additionally, the difference between the calculated positions in the vehicle running direction may be compared with a threshold in step S107.

The object detection apparatus according to the above described embodiment has the following advantages.

A detected object is determined to be a real object if the calculated positions of the detected object calculated respectively based on two or more of the combinations of the sensors are the same, each of the combinations including an adjacent two of the sensors, one of which is used as a direct detection sensor and the other is used an indirect sensor. Accordingly, it is possible to reduce the possibility of erroneously determining a ghost to be a real object.

Here, let's assume a configuration in which a detected object is determined to be a ghost if this object has not been detected by at least two or more of the combinations of the sensors. In a situation where a plurality of objects are present in the vicinity of a vehicle, and one of the objects is quite distant from the other objects, this object may be erroneously determined to be a ghost according to this configuration.

According to the above described embodiment, such an object is determined to be a real object without performing the ghost determination operation, if the difference between the detected distances calculated based on different indirect waves exceeds the threshold, and accordingly the triangulation method does not hold for the position calculation. Hence, according to the above described embodiment, it is possible to reduce the possibility of erroneously determining a real object to be a ghost.

Modifications

It is a matter of course that various modifications can be made to the above described embodiment as described below. In the above embodiment, the probing waves are ultrasonic waves. However, the probing waves may be sound waves or radio waves.

The object detection apparatus of the above embodiment is mounted on the vehicle 30. However, it may be mounted on a moving body other than a vehicle such as an aircraft, a ship, or a robot. Further, the object detection apparatus may be mounted on a stationary body to detect distances between the stationary body and objects around the stationary body. This is because multiple reflection can occur between the stationary body and the objects around the stationary body. Further, the object detection apparatus may be worn or carried by a human to detect an approaching object.

The above explained preferred embodiments are exemplary of the invention of the present application which is described solely by the claims appended below. It should be understood that modifications of the preferred embodiments may be made as would occur to one of skill in the art.

What is claimed is:

1. An object detection apparatus for detecting at least two objects present in a vicinity thereof by transmitting first probing waves from a first position and subsequently transmitting second probing waves from a second position different from the first position, a detection area of the first probing waves and a detection area of the second probing waves being partially overlapped with each other, and by receiving reflected versions of the first and second probing waves as detection data of the at least two objects, comprising:

a first acquisition unit configured to acquire, as a first direct wave group including one or more first direct waves, the reflected versions of the first probing waves received as the one or more first direct waves at the first position, and acquire, as a first indirect wave group including one or more first indirect waves, the reflected versions of the first probing waves received as the one or more first indirect waves at the second position;

a second acquisition unit configured to acquire, as a second indirect wave group including one or more second indirect waves, the reflected versions of the second probing waves received as the one or more second indirect waves at the first position, and acquire, as a second direct wave group including one or more second direct waves, the reflected versions of the second probing waves received as the one or more second direct waves at the second position;

a first calculation unit configured to calculate a potential position for each of the at least two objects for each combination of one of the first direct waves and one of the first indirect waves;

a second calculation unit configured to calculate a potential position for each of the at least two objects for each combination of one of the second direct waves and one of the second indirect waves; and a determination unit configured to determine whether one of the at least two objects is a ghost or not depending on whether the position of the one of the at least two objects has been calculated by both the first and second calculation units or has been calculated by only one of the first and second calculation units;

wherein the determination unit is configured to, in the presence of the at least two objects in a vicinity of the apparatus, determine that a first object whose position is calculated by the first calculation unit is a real object if a difference between detected distances calculated based on reception times of the first direct waves reflected by the first object and a second object, or a difference between detected distances calculated based on reception times of the first indirect waves reflected by the first object and the second object is larger than a predetermined threshold, and determine that a third object whose position is calculated by the second calculation unit is a real object if a difference between detected distances calculated based on reception times of the second direct waves reflected by the third object and a fourth object or a difference between detected distances based on reception times of the second indirect waves reflected by the third object and the fourth object is larger than a predetermined threshold.

2. The apparatus according to claim 1, wherein the determination unit is configured to, in determining whether the one of the at least two objects is a ghost or not, for each combination of one of the calculated positions of the one of the at least two objects calculated by the first calculation unit and one of the calculated positions of the one of the at least two objects calculated by the second calculation unit, determine whether or not a difference in lateral position between the calculated positions belonging to the combination is smaller than a predetermined threshold, and if the difference in lateral position between the calculated potential positions belonging to the combination is smaller than the predetermined threshold, then determine that the one of the at least two objects is a real object.

* * * * *